United States Patent [19]

Suzuki et al.

[11] Patent Number: 5,067,052
[45] Date of Patent: Nov. 19, 1991

[54] VEHICULAR HEADLAMP HAVING INCLINATION DETECTOR

[75] Inventors: Takanori Suzuki; Makoto Ito, both of Shizuoka, Japan

[73] Assignee: Koito Manufacturing Co. Ltd., Tokyo, Japan

[21] Appl. No.: 689,563

[22] Filed: Apr. 23, 1991

[30] Foreign Application Priority Data

May 24, 1990 [JP] Japan .................. 2-132547

[51] Int. Cl.$^5$ .......................................... R60Q 1/00
[52] U.S. Cl. .................................. 362/61; 362/419; 362/287; 362/275; 362/269
[58] Field of Search .............. 362/61, 66, 80, 269, 362/270, 287, 295, 418, 419, 421, 422, 424, 427, 430, 275

[56] References Cited

U.S. PATENT DOCUMENTS

| | | | |
|---|---|---|---|
| 3,612,854 | 10/1971 | Todd et al. | 362/269 |
| 4,628,414 | 12/1986 | Ricard | 362/61 |
| 4,802,067 | 1/1989 | Ryder et al. | 362/61 |
| 4,922,387 | 5/1990 | Ryder et al. | 362/419 |
| 4,970,629 | 11/1990 | McMahan | 362/419 |
| 4,984,136 | 1/1991 | Yamagishi et al. | 362/80 |

FOREIGN PATENT DOCUMENTS

1006738  4/1957  Fed. Rep. of Germany ...... 362/277

Primary Examiner—Ira S. Lazarus
Assistant Examiner—D. M. Cox
Attorney, Agent, or Firm—Sughrue, Mion, Zinn, Macpeak & Seas

[57] ABSTRACT

A vehicular headlamp in which the zero point adjustment axis can be freely set and the zero point adjustment can be achieved with ease. An inclination member with a light reflecting surface for setting the axis of irradiation of a lamp is supported by an aiming mechanism in such a manner that the inclination member is inclinable about both horizontal and vertical axes with respect to a reference member arranged behind the inclination member. An inclination detector is provided which includes a stationary holder secured to the reference member, a movable holder coupled to the stationary holder in such a manner that the movable holder is slidable forwardly and rearwardly, a slider engaged with the movable holder in such a manner that the slider is slidable forwardly and rearwardly, the slider being elastically urged so that the front end thereof is abutted against the inclination member and so that the slider is allowed to slide as the inclination member inclines about the vertical axis, and a zero point adjustment shaft having a gear mounted thereon which is engaged with a rack formed on one side of the movable holder. The zero point adjustment shaft is supported by the stationary holder and extends in a direction perpendicular to the direction of slide of the movable holder.

17 Claims, 8 Drawing Sheets

VEHICULAR HEADLAMP HAVING INCLINATION DETECTOR

BACKGROUND OF THE INVENTION

The present invention relates to a vehicular headlamp having an inclination detector for detecting whether or not the irradiation angle of the headlamp in a horizontal plane is correct, and more particularly to a headlamp which is designed so that, when the irradiation angle is not correct, it can be adjusted with ease to a correct value.

One example of a vehicular headlamp aiming mechanism is disclosed, for instance, in commonly assigned U.S. patent application Ser. No. 07/370,949. A conventional aiming mechanism of this type will be described with reference to a movable reflector type headlamp.

Figure 11:
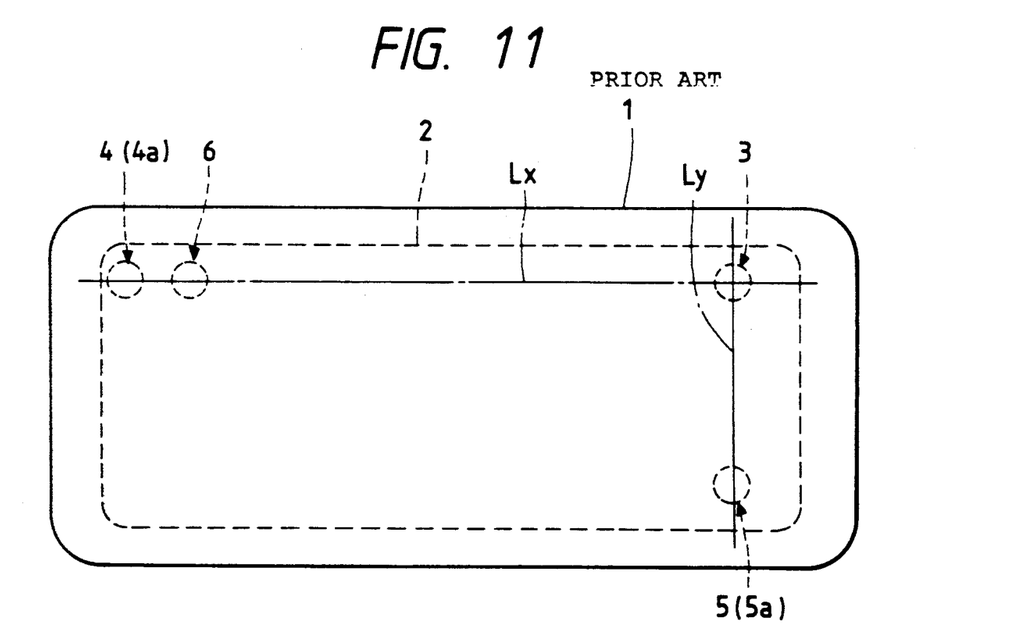
FIG. 11 is a front view for a description of the arrangement of an aiming mechanism in a conventional headlamp.

As shown in FIG. 11, a reflector 2 is supported on a lamp body 1 at three points, i.e., one swing fulcrum 3 fixed to the lamp body, and two aiming points 4 and 5 which are engaged with two aiming screws 4a and 5a coupled to the lamp body so that their distances from the lamp body can be adjusted as desired. More specifically, the one swing fulcrum 3 and the two aiming points 4 and 5 are positioned in such a manner that the horizontal axis Lx connecting the horizontal aiming point 4 and the swing fulcrum 3 and the vertical axis Ly connecting the vertical aiming point 5 and the swing fulcrum 3 are perpendicular to each other as viewed from the front. By turning the aiming screws 4a and 5a, the distances of the aiming points 4 and 5 from the lamp body are changed so that the reflector 2 is swung about the horizontal axis Lx and the vertical axis Ly, that is, the axis of irradiation of the headlamp is swung both in a horizontal plane and in a vertical plane.

Between the lamp body 1 and the reflector 2 is provided an inclination detector 6 which is composed of a movable holder which can be moved back and forth, and a slider which is coupled to the movable holder in such a manner that the slider is movable back and forth together with the reflector 2. The slider is graduated, and the movable holder has a reference point marked on it. The inclination detector 6 thus provided indicates from the position of the reference point the amount of inclination of the reflector 2 in a horizontal plane.

However, the headlamp with the above type of inclination detector is disadvantaqeous in that the movable holder protrudes from the rear side of the lamp body. Therefore, in operating the movable holder to set its reference point to the scale reading "0" (hereinafter referred to as "a zero point adjustment" when applicable), it is necessary for the operator to bend over the lamp and to stretch his hand towards the rear wall of the lamp body. Thus, the zero point adjustment is considerably troublesome for the operator.

SUMMARY OF THE INVENTION

In view of the foregoing, an object of the invention is to provide a vehicular headlamp in which the zero point adjustment axis can be set relatively freely, and the zero point adjustment can be achieved with ease.

The foregoing and other objects of the invention have been achieved by the provision of a vehicular headlamp in which an inclination member with a light reflecting surface for setting the axis of irradiation of a lamp is supported by an aiming mechanism in such a manner that the inclination member is mounted so as to be inclinable with respect to a reference member arranged behind the inclination member, and which, according to the invention, includes an inclination detector which comprises: a stationary holder secured to the reference member; a movable holder coupled to the stationary holder in such a manner that the movable holder is slidable forwardly and rearwardly; a slider engaged with the movable holder in such a manner that the slider is slidable forwardly and rearwardly, the slider being elastically urged so that the front end thereof is abutted against the inclination member, whereby the slider is allowed to slide as the inclination member inclines about a vertical axis; and a zero point adjustment shaft having a gear mounted thereon which is engaged with a rack formed on one side of the movable holder, the zero point adjustment shaft being supported by the stationary holder and extending in a direction perpendicular to the direction of slide of the movable holder.

In one form of the inventive vehicular headlamp, the reference member is a lamp body, the inclination member is a reflector which is inclinable inside the lamp body, and the zero point adjustment shaft penetrates the lamp body, having a driving part exposed outside the lamp body.

In another embodiment of the inventive vehicular headlamp, the reference member is a lamp housing, and the inclination member is a combined lamp body and reflector unit having a reflector formed on the inner surface thereof.

The amount of inclination of the inclination member about the vertical axis is manifested as forward or rearward displacement of the slider relative to the movable holder. Therefore, the amount of inclination of the inclination member in the horizontal plane, i.e., the amount of inclination in the angle of irradiation of the headlamp in the horizontal plane, can be detected from the above-described displacement of the slider with respect to the movable holder. Therefore, the angle of irradiation of the headlamp in the horizontal plane can be adjusted, after the zero point adjustment of the scale of the inclination detector with the zero point adjustment shaft, by inclining the inclination member with the aiming mechanism until the displacement of the slider is zeroed.

Furthermore, the zero point adjustment shaft can be mounted so as to protrude from a desired side of the headlamp. For instance, the zero point adjustment shaft can be mounted so as to protrude from the upper wall of the headlamp. In this case, the zero point adjustment can be achieved with ease.

DESCRIPTION OF THE PREFERRED EMBODIMENTS

The invention will now be described in further detail with reference to preferred embodiments shown in the accompanying drawings.

Figure 1:
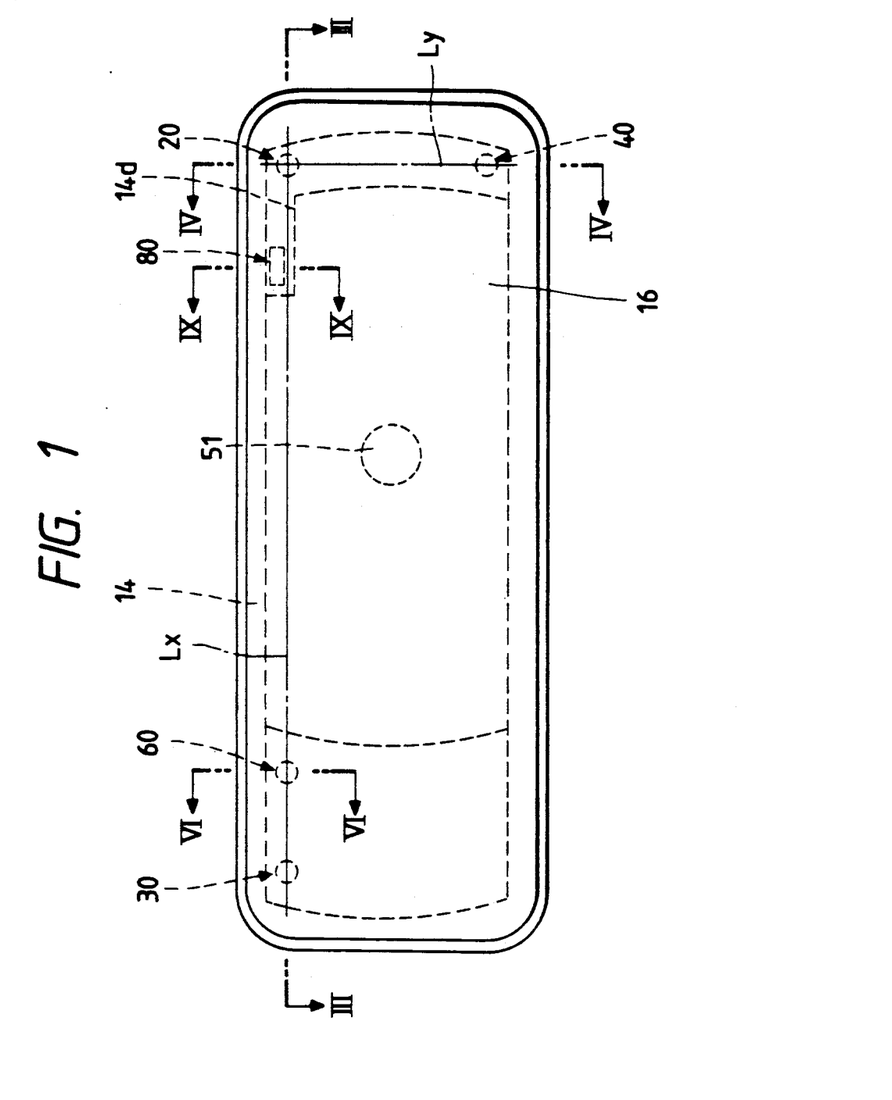
FIG. 1 is a front view of a movable reflector type headlamp incorporating an aiming mechanism of the invention.
Figure 2:
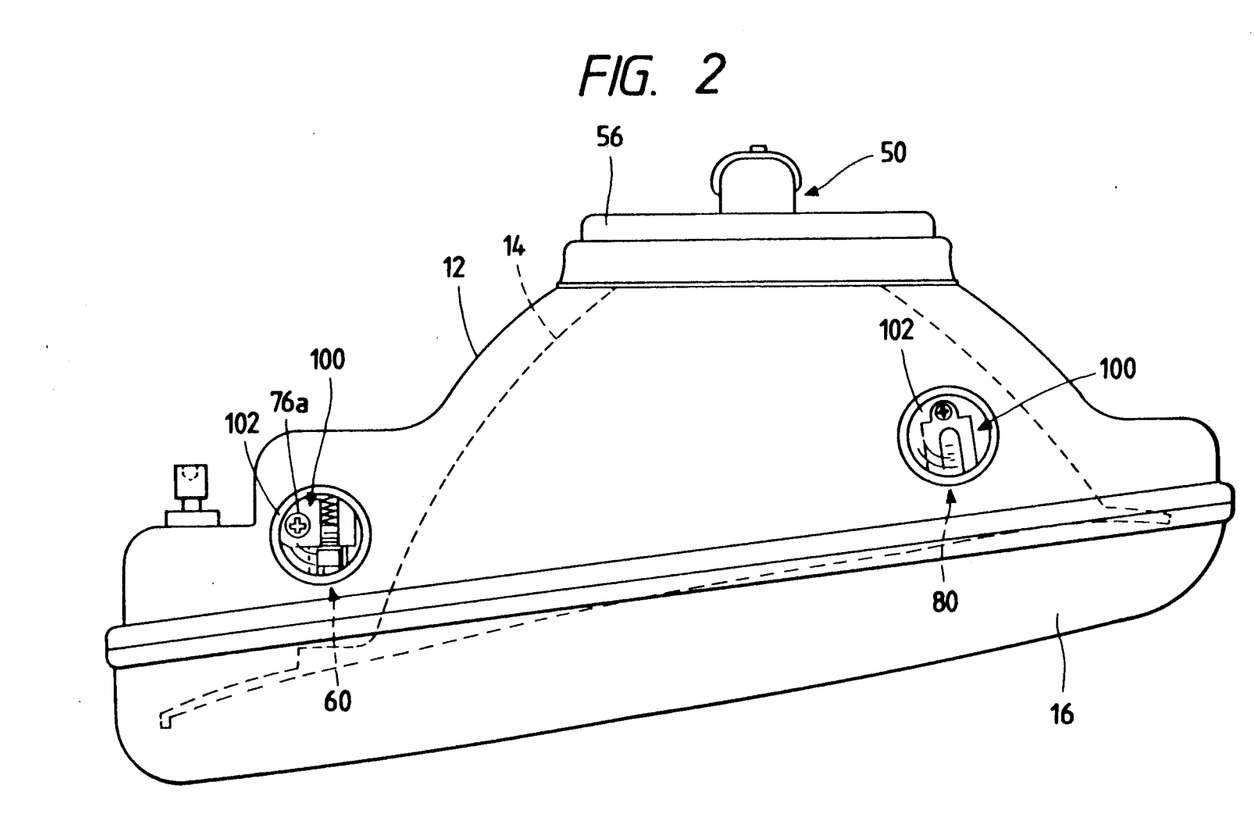
FIG. 2 is a plan view of the headlamp shown in FIG. 1.
Figure 3:
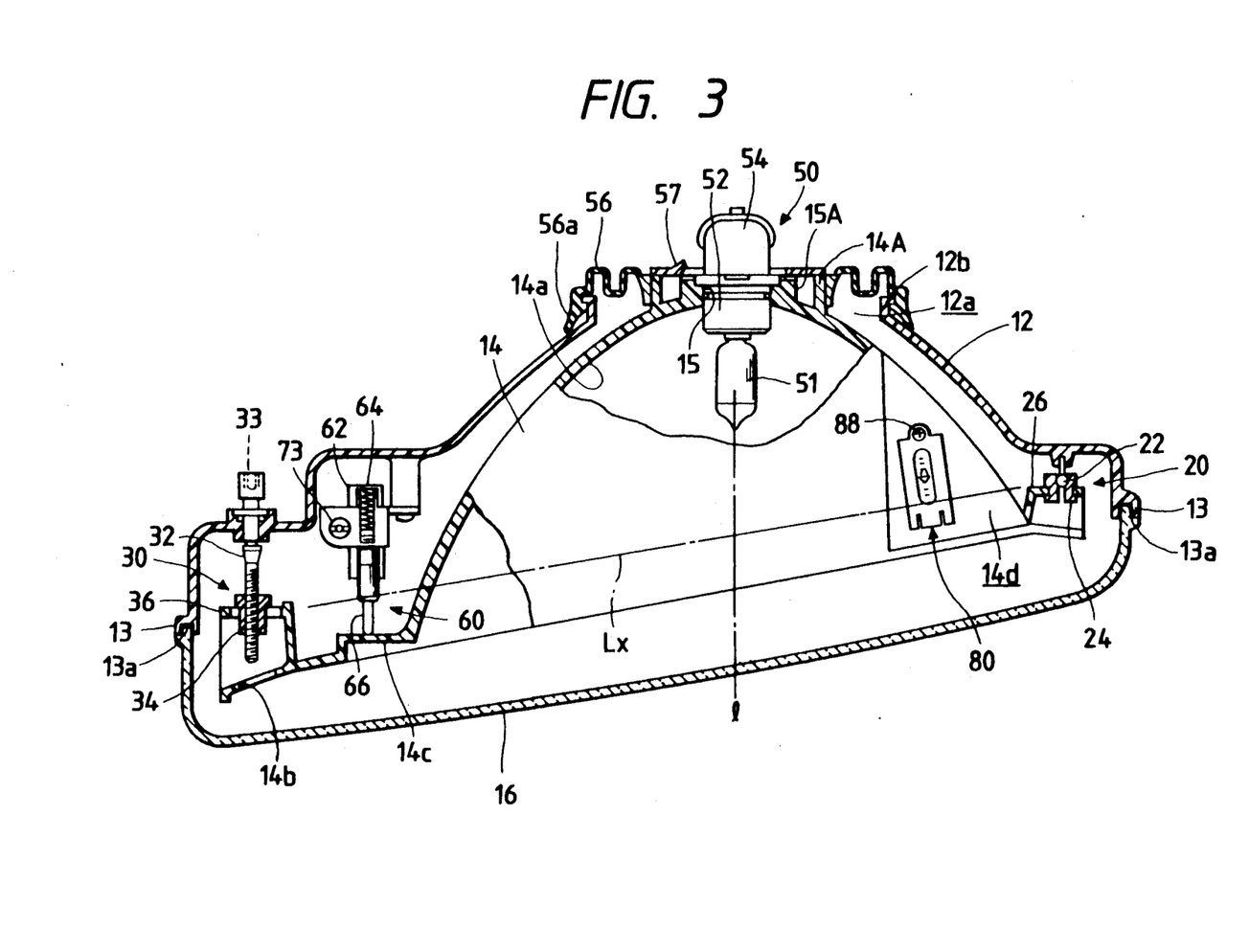
FIG. 3 is a horizontal sectional view, taken along line III—III in FIG. 1, with parts cut away.
Figure 4:
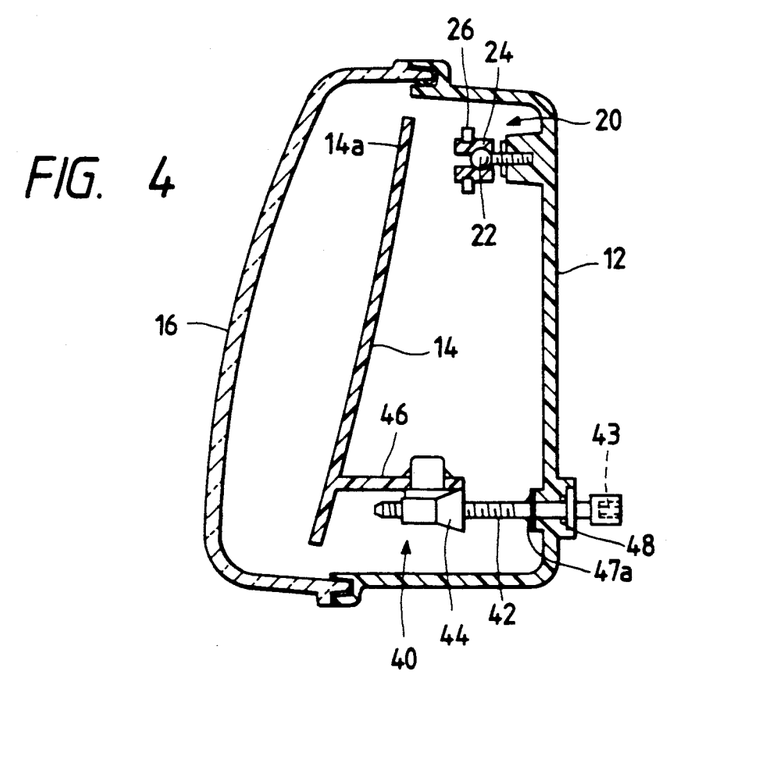
FIG. 4 is a sectional view taken along line IV—IV in FIG. 1.
Figure 5A:
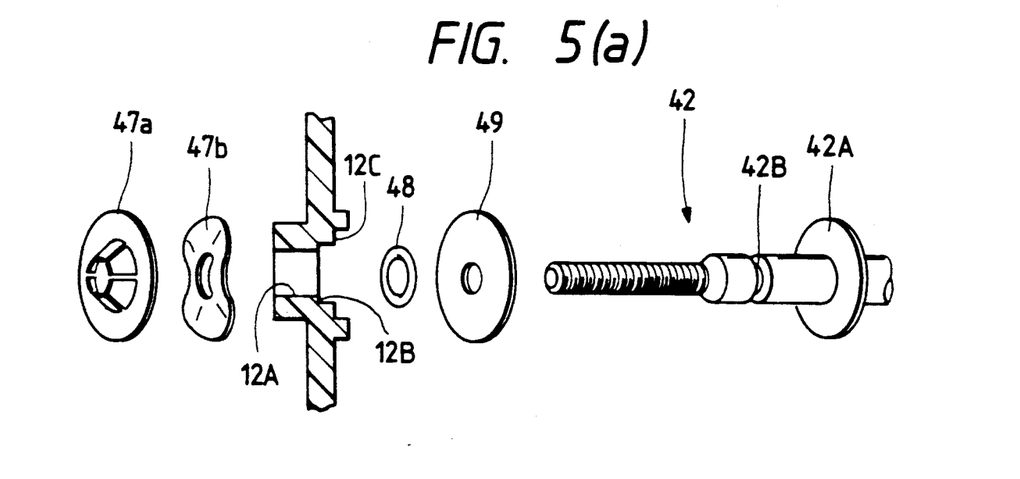
FIGS. 5(a) and 5(b) are, respectively, an exploded view and an enlarged sectional view showing a support for an aiming screw.
Figure 5B:
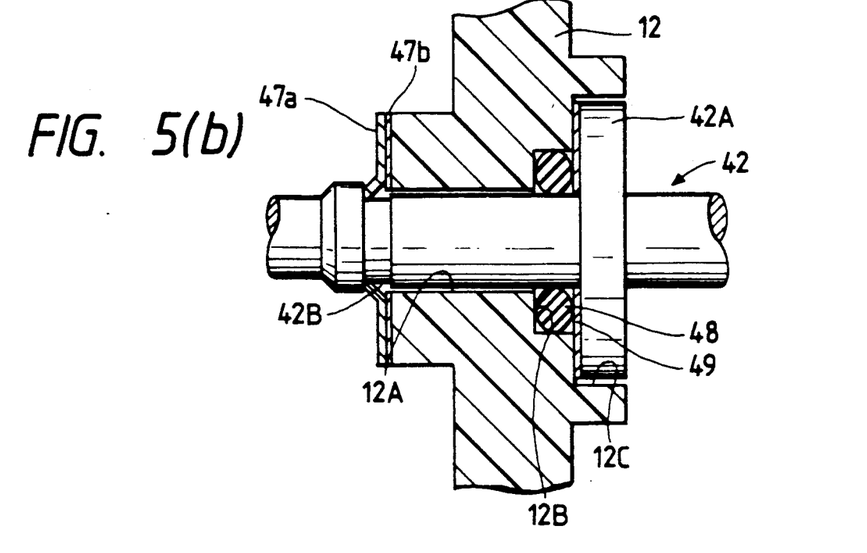
Figure 6:
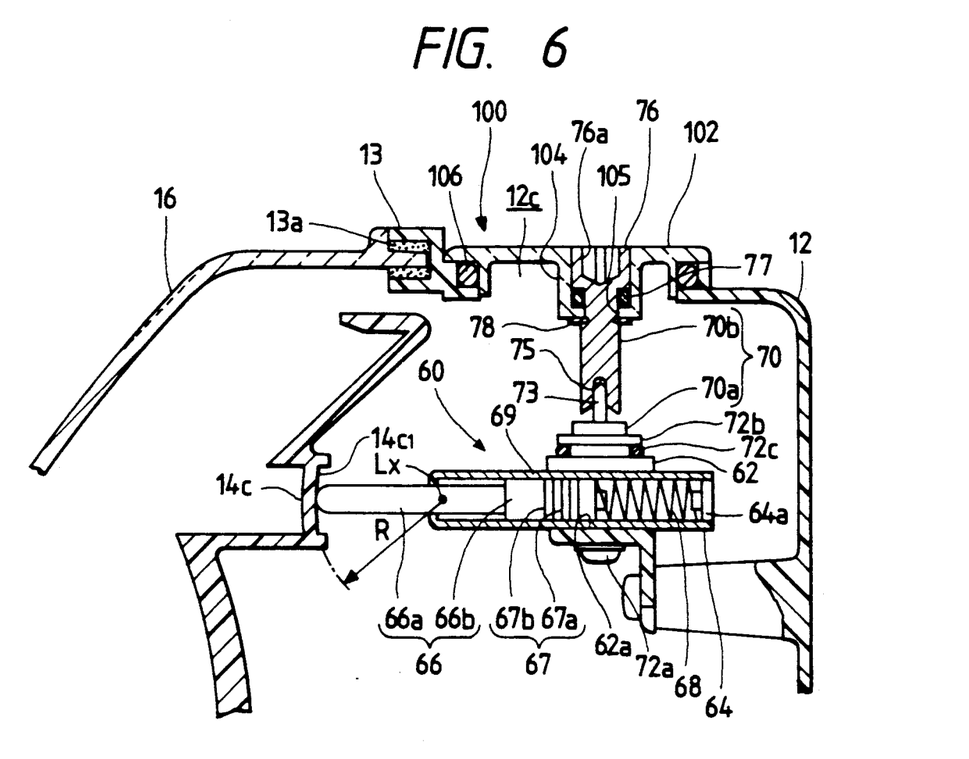
FIG. 6 is a sectional view taken along line VI—VI in FIG. 1.
Figure 7:
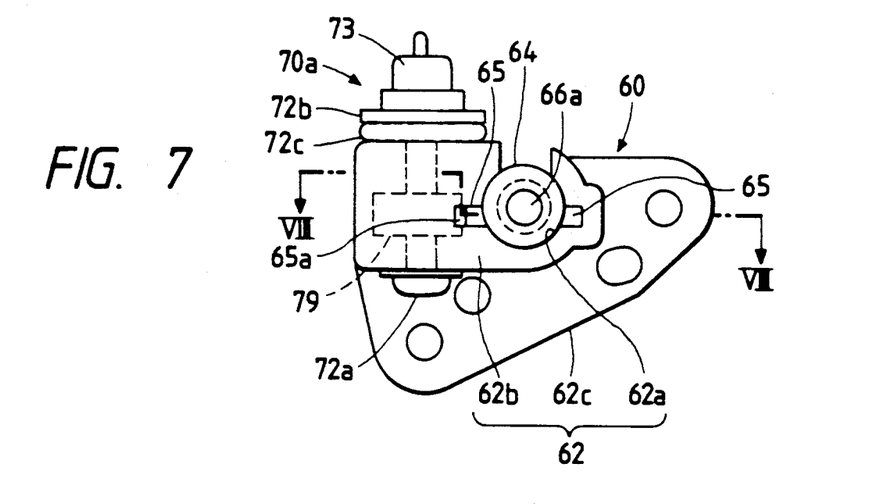
FIG. 7 is a sectional view taken along line VII—VII in FIG. 1.
Figure 8:
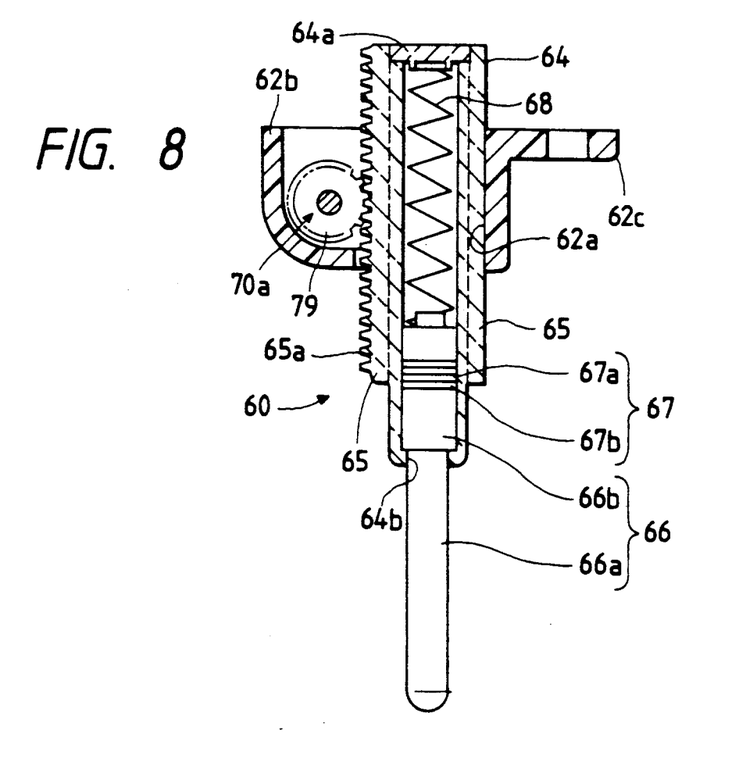
FIG. 8 is a sectional view taken along line VIII—VII in FIG. 7.
Figure 9:
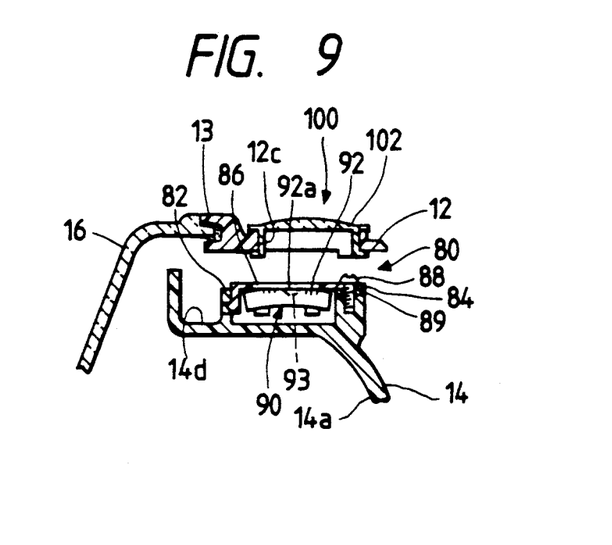
FIG. 9 is a sectional view taken along line IX—IX in FIG. 1.

FIGS. 1 through 6 show an example of a movable reflector type vehicular headlamp which constitutes one embodiment of the invention. The vehicular headlamp includes a reference member, namely, a lamp body, and an inclination member, namely, a reflector. FIGS. 1 and 2 are, respectively, a front view and a plan view showing the movable reflector type headlamp incorporating an aiming mechanism. FIG. 3 is a horizontal sectional view taken along line III—III in FIG. 1, with parts cut away, showing the headlamp of FIG. 1. FIG. 4 is a sectional view taken along line IV—IV in FIG. 1. FIGS. 5(a) and 5(b) are, respectively, an exploded perspective view and an enlarged sectional view of an aiming screw support. FIG. 6 is a sectional view taken along line VI—VI in FIG. 1 showing a first inclination detector mounting position. FIG. 7 is a front view of the inclination detector. FIG. 8 is a sectional view taken along line VIII—VIII in FIG. 7. FIG. 9 is a sectional view taken along line IX—IX in FIG. 1.

In these figures, reference numeral 12 designates a container-shaped lamp body, which accommodates a reflector 14 with a light bulb 51. A front lens 16 is engaged with the rectangular front opening of the lamp body 12. An aluminum layer is formed on the inner surface of the reflector by vacuum deposition, thus providing a light reflecting surface 14a which is paraboloidal. The light reflecting surface 14a has a lamp irradiation axis 1. Reference numeral 13 designates a seal groove formed in the periphery of the front end opening of the lamp body 12. The seal groove is filled with a sealing agent 13a, so that the leg of the front lens 16 is sealingly fitted in the seal groove 13.

As shown in FIG. 1, the reflector 14 is supported at three points, i.e., one swing fulcrum 20 at the right angle vertex of a right-angled triangular as viewed from the front, and a horizontal aiming point 30 and a vertical aiming point 40 which are at the remaining vertices. The swing fulcrum 20 has a ball joint structure wherein a ball 22 protruding from the lamp body 12 is engaged with a socket 4 provided on the reflector 14, thus being stationary with respect to the lamp body 12. The aiming point 30 includes a horizontal aiming screw 32 for adjustment which is screwed into the lamp body 12, and a nut 34 provided on the reflector 14. Similarly, the aiming point 40 includes a vertical aiming screw 42 which is adjustably screwed into the lamp body 12, and a nut 44 provided on the reflector 14. By turning the aiming screws 32 and 34, the nuts 34 and 44 are moved along the aiming screws 32 and 34, respectively, so that the distances of the aiming points 30 and 40 from the lamp body 12 are changed.

The socket 24 which is engaged with the ball 22 is fixedly secured to a bracket 26 extending from the rear surface of the reflector 14. The nuts 34 and 44, with which the aiming screws 32 and 42 are engaged, are supported by respective brackets 34 and 46 protruding from the rear surface of the reflector 14. As shown in FIG. 3, the reflector 14 has a through-hole 14b which confronts the aiming screw 32. The through-hole 14b eliminates the difficulty that, when the aiming screw 32 is turned so that the aiming point 30 approaches the lamp body, the aiming screw 32 and the reflector 14 interfere with each other.

The supports provided for the aiming screws will now be described. FIGS. 5(a) and 5(b) show the support for the horizontal aiming screw; however, it should be noted that the support for the vertical aiming screw is the same as the support for the horizontal aiming screw. The lamp body 12 has a screw inserting hole 12A in its rear wall. An O-ring receiving recess 12B is formed around the screw inserting hole 12A, and a flange receiving recess 12C is formed around the O-ring receiving recess 12B. The aiming screw 42 inserted into the screw inserting hole 12A is held by a flange 42A formed thereon and a push-on fixer 47a engaged in a ring groove 42b. Further in FIGS. 5(a) and 5(b), reference numeral 47b designates a wave washer used to minimize the fluctuations in dimension of the relevant parts; 48, an O-ring fitted in the O-ring receiving recess 12B; and 49, a slide washer provided on the flange slide surface of the flange receiving recess 12C. When the aiming screw 42 is installed, the O-ring 48 is deformed radially thereby to sealingly support the screw 42. The slide washer 49 protects the flange 42A from wear. In FIGS. 3 and 4, reference numerals 33 and 43 designate screwdriver engaging parts formed at the ends of the aiming screws 32 and 42, respectively.

As described above, the vertical aiming point 40 (corresponding to the engaging point of the aiming screw 42 and the nut 44) is positioned on the vertical axis Ly, which is perpendicular to the lamp irradiation axis l and passes through the swing fulcrum 20, while the horizontal aiming point 30 (corresponding to the engaging point of the aiming screw 32 and the nut 33) is positioned on the horizontal axis Lx which is perpendicular to the vertical axis Ly and passes through the swing fulcrum 20. Hence, by turning the horizontal aiming screw 32, the reflector 14 is swung about the vertical axis Ly, so that the inclination of the reflector in the horizontal plane, that is, the angle of irradiation of the headlamp in the horizontal plane, is changed. Similarly, by turning the vertical aiming screw 42, the reflector 14 is swung about the horizontal axis Lx, so that the inclination of the reflector in a vertical plane, that is, the angle of irradiation of the headlamp in the vertical plane is changed. Thus, the amount of inclination of the reflector 14, and accordingly the angle of irradiation of the headlamp, can be adjusted by turning the two aiming screws 32 and 42.

In FIG. 3, reference numeral 50 designates a bulb socket with which a bulb 51 is engaged. The lamp body 12 has an opening 12a in the rear portion in which the bulb socket is detachably fitted. The bulb socket 50 is inserted into the opening 12a and fitted in a socket hole 15 which is formed in the rear end portion of the reflector 14. The socket hole 15 is surrounded by a protruding annular wall 15A formed on the rear end portion of the reflector 13, and the annular wall 15A is surrounded by a cylindrical rearward protrusion 14A extending from the reflector 14. A rubber cover 56 is provided between the rearward protrusion 14A and the periphery 12b of the lamp body opening 12a so as to close the lamp body opening 12a. The inner periphery 56a of the rubber cover 56 is in close contact with the outer wall of the rearward protrusion 14A of the reflector 14, that is, the rubber cover 56 is sealingly connected to the rearward protrusion 14A. Further in FIG. 3, reference numeral 52 designates a base to which the bulb 51 is connected; 54, an L-shaped connector having an internal connecting terminal; and 57, a socket fixture which is threadedly engaged with the protruded wall 14A to fixedly fit the bulb socket 50 in the socket hole 15 formed in the lamp body.

Reference numeral 60 designates a first inclination detector disposed between the lamp body 12 and the reflector 14 in the horizontal plane including the horizontal axis Lx. The first inclination detector 60 is employed to detect the amount of inclination of the reflector in a horizontal plane. The first inclination detector 60, as shown best in FIGS. 6 through 8, includes a frame-shaped stationary holder 62 secured to the rear wall of the lamp body 12, a movable holder 64 which can be adjusted in position by moving it back and forth, a bar-shaped slider 66 which is slidably inserted into the movable holder 64, a compression coil spring 68 held in the movable holder 64 to push the slider 66 out of the movable holder 64, and a zero point adjustment shaft 70 vertically extending in such a manner that its upper end portion is supported on the upper wall of the lamp body and its lower end portion is supported on the stationary holder 62. The shaft 70 moves the movable holder 64 back and forth to adjust the position of the latter.

The stationary holder 62 is composed of a movable holder receiving recessed portion 62a, a shaft case 62b accommodating the gear 79 of the zero point adjustment shaft 70, and a bracket 62c which is used to secure the stationary holder to the lamp body. That is, the stationary holder 62 is obtained by forming those parts 62a, 62b and 62c as one unit. The movable holder 64 is in the form of a cylinder with two flanges 65 on the right and left sides. The movable holder 64 is inserted into the movable holder receiving recessed portion 62a. The movable holder 64 accommodates the slider 66 in such a manner that the slider 66 is urged by the compression coil spring 68. The slider 66 is stepped, that is, the front end portion 66a of the slider 66 is smaller in diameter. This front end portion 66a is pushed out of the movable holder by the compression coil spring until it reaches a vertical wall 14c of the reflector 14. Thus, the slider 66 is slid back and forth in the movable holder 64 as the reflector 14 swings about the vertical axis Ly. Graduation lines 67 are marked on the rear end portion 66b (larger in diameter) of the slider 66 in correspondence to the reference line 69 marked on the movable holder 64 which is transparent (see FIG. 6). Of the graduation lines 67, the center line 67a is red, while the remaining lines are blue. By aligning the red center graduation line with the reference line 69 (hereinafter referred to as "a zero point adjustment" when applicable) the inclination of the reflector 4 can be read from the amount of shift of the center graduation line from the reference line. As shown in FIG. 6, the surface 14c$_1$ of the vertical wall 14c of the reflector against which the front end of the slider 66 abuts is a curved surface having a radius R whose center is on the horizontal axis Lx. Therefore, the slider 66 is not moved when the reflector 14 inclines upwardly or downwardly, that is, the scale reading of the first inclination detector 60 is maintained unchanged when the inclination of the reflector is adjusted upwardly or downwardly. In FIG. 6, reference character 64a designates a cap serving as a spring seat which is provided at the rear end of the movable holder 64.

One of the flanges 65 of the movable holder 64 has a rack 65a which is engaged with the gear 79, which is arranged in the shaft case 61b. The gear 79 is an integral part of the zero point adjustment shaft 70. The rotation of the zero point adjustment shaft 70 is transmitted through the gear 79 and the rack 65a to the movable holder 64 to move the latter back and forth. The zero point adjustment shaft 70, as shown in FIG. 6, includes a driven shaft 70a supported on the shaft case 62b, and a driving shaft 70b supported in a sight window 100 formed in the upper wall of the lamp body, with the upper end portion of the driven shaft 70a coupled to the lower end portion of the driving shaft 70b. The driven shaft 70a and the gear 79 are provided as one unit. A screw 72a is screwed into the lower end portion of the driven shaft 70a in such a manner that the screw 72a penetrates the bottom wall of the shaft case 62b of the stationary holder to thus prevent the driven shaft from coming off.

An O-ring 72c is interposed between the upper end face of the shaft case and a flange 71 formed on the upper end portion of the driven shaft. The O-ring 71c, being held between the flange 71b and the upper end face of the shaft case as described above, absorbs torque which would otherwise be applied to the driven shaft 70a by the elastic force of the compression coil spring 68, thus maintaining the driven shaft 70a stopped. An engaging protruding strip 73 is formed on the upper end of the driven shaft 70a which protrudes over the shaft case, while an engaging recessed stripe 75 is formed in the lower end portion of the driving shaft 70b. The engaging protruding strip 73 is engaged with the engaging recessed stripe 75 so that the driven shaft 70a is engaged with the driving shaft 70b.

An opening 12c is formed in the upper wall of the lamp body right above the inclination detector 60. A transparent cap 102 is fitted in the opening 12c thus formed. The transparent cap 102 forms the aforementioned sight window 100 for reading the scale of the inclination detector. A downward protrusion 104 in the form of a cylinder with an internal flange is formed on the rear surface of the transparent cap 102. The internal flange 105 of the downward protrusion is engaged through an O-ring 77 with the upper end portion 76 of the driving shaft 70b, which is larger in diameter. An E-ring is engaged with the driving shaft 70b to cooperate with the internal flange to prevent the latter from coming off. A screw-driving engaging recess 76a, which is used for operating the zero point adjustment shaft 70, is formed in the upper end face of the upper end portion 76 of the driving shaft 70b. Further in FIG. 6, reference numeral 106 designates an O-ring provided in the transparent cap mounting region.

The zero point adjustment of the scale is carried out with the zero point adjustment shaft 70. As the zero point adjustment shaft 70 is turned, the gear 79 is turned in the shaft case 62b to move the movable holder relative to the stationary holder 62. In this operation, since the front end of the slider 66 is pushed against the reflector 14 by the elastic force of the compression coil spring 68, the movable holder 64 is slid relative to the slider 64, that is, the reference line marked on the movable holder 64 is slid along the scale 67. Hence, in the case where the inclination of the reflector in the horizontal plane is correct, the zero point adjustment of the scale of the inclination detector 60 can be readily achieved by turning the zero point adjustment shaft 70.

In the case where, after the zero point adjustment, the reflector 14 is displaced by being swung about the vertical axis Ly for some reason, that is, in the case where the angle of irradiation of the headlamp in the horizontal direction is changed, the amount of inclination of the reflector is indicated as an amount of shift between the central graduation line 67a and the reference line 69 of the inclination detector 60. Hence, the change in inclination of the reflector 14, that is, the change in the angle of irradiation of the headlamp, can be detected immediately. In this case, the aiming screw 32 is operated until the amount of shift between the central graduation line and the reference line is eliminated, that is, the degree of inclination of the reflector is adjusted. Thus, the angle of irradiation of the headlamp in the horizontal plane can be set correctly with ease.

In the above-described embodiment, the zero point adjustment shaft 70 of the inclination detector 60 is divided into two parts, namely, the driven shaft 70a and the driving shaft 70b, which are connected through their engaging portions 73 and 75. Therefore, the zero point adjustment shaft 70 can be readily assembled and installed by first arranging the driven shaft 70a in the lamp body, and then with the driving shaft 70b engaged with the transparent cap 102, engaging the engaging portions 73 and 75.

In FIGS. 1 through 3 and 9, reference numeral 80 designates a second inclination detector, namely, a level which is used to detect the inclination of the reflector 14 in a vertical plane, that is, the inclination in the direction of irradiation of the headlamp in a vertical plane. A recess 14d is formed in the upper portion of the reflector 14. The wall which defines the recess 14d serves as a level casing 82. The casing 82 is closed with a cover 84 on the inner surface of which a linear level vial is fixedly provided. The cover 84 has an opening 86 through which the graduation lines of the level vial 90 are exposed. Reference numeral 92 designates a scale composed of the aforementioned graduation lines marked on the level vial; 92a, one of the graduation lines which corresponds to the zero point (hereinafter referred to as "a zero point graduation line 92a" when applicable); and 93, a bubble. In the casing 82, the level vial 90 is arranged so that the scale 92 extends orthogonally with respect to the horizontal axis Lx. Therefore, the inclination of the reflector 14 about the horizontal axis Lx appears as the amount of shift of the bubble 93 from the zero point graduation line 92a.

Reference numeral 88 designates a zero point adjustment screw; and 89, a leaf spring. By turning the zero point adjustment screw 88, the position of the bubble in the level vial 90 can be adjusted, that is, the zero point adjustment can be achieved. A transparent cap 102 serving as a sight window 100 is fitted in an opening 12c formed in the upper wall of the lamp body in such a manner that the opening confronts with the level 80. Through the sight window 100, the scale of the level can be read, that is, the amount of inclination of the reflector in the vertical plane can be read. The adjustment screw 88 can be turned by first removing the cap 102, and then inserting a screwdriver into the lamp body through the opening 12c to turn the adjustment screw.

The adjustment of adjusting the inclination detectors 60 and 80 which is carried out when the headlamp is installed on the vehicle, and the adjustment of the angle of irradiation of the headlamp will now be described.

The headlamp is designed such that, when, in the first inclination detector 60, the central graduation line 67a of the slider 66 is in alignment with the reference line 69, the light distribution characteristic of the headlamp in the horizontal plane is correct, and when, in the second inclination detector, which is the level 80, the bubble 93 is at the zero point graduation line 92a of the linear scale 92, the light distribution characteristic of the headlamp in the vertical plan is correct.

When the headlamp is initially installed on the vehicle, in general the scales of the inclination detectors will not be correct in indication because of various manufacturing tolerances and errors. Therefore, it is necessary to adjust the first and second inclination detectors 60 and 80 so that their scales are correct in their initial indication.

An example of a method for adjusting these scales will be described.

In the case of the first inclination detector 60, the vehicle is set on a horizontal surface, a light distribution screen is set a predetermined distance from the headlamp, and the headlamp is turned on. Under this condition, the aiming screw 32 is turned until the headlamp light distribution is adjusted to a predetermined position on the light distribution screen in a horizontal direction. However, in this case, for instance, because of variations in the dimensions of the lamp mount on the vehicle body, the reference line 69 may not be in alignment with the central graduation line 67a. In this case, the zero point adjustment shaft 7 is turned to move the movable holder 76 back and forth until the central graduation line 67a aligns with the reference line 69, that is, the zero point adjustment is carried out. Thus, when the angle of irradiation of the headlamp in the horizontal plane is correct, the first inclination detector can be adjusted so that the reference line 69 indicates the zero point graduation line (i.e., the central graduation line 67a).

In the case of the second inclination detector, that is, in the case of the level 80, the two aiming screws 32 and 42 are turned until the hot zone of the headlamp is set to a predetermined position on the light distribution screen in a vertical plane. However, in this case, the bubble may not be at the zero point graduation line 92a of the scale 92, for mount on the vehicle. In this case, the zero point adjustment screw 88 is turned until the bubble 93 is at the zero point graduation line 92a of the scale 92. Thus, when the angle of irradiation of the headlamp in the vertical plane is correct, the second inclination detector, namely, the level 80, can be adjusted so that the bubble indicates the zero point graduation line 92a of the scale.

Thereafter, the user may adjust the angle of irradiation of the headlamp. When the user observes the interior of the headlamp through the sight windows 100 and sees that, in the first inclination detector 60, the reference line 69 is not in alignment with the central graduation line 67a, and/or, in the second inclination detector (the level 80), the bubble 93 is shifted from the zero point graduation line 91, the amount of shift in the degree of inclination of the lamp body in the horizontal plane or in the vertical plane, i.e., the amount of shift in the angle of irradiation of the headlamp in the vertical plane, can be read from the amount of shift indicated by the first or second inclination detector. In this case, the aiming screws 32 and 42 are turned so that, in the first inclination detector 60, the reference line 69 is in alignment with the central graduation line 67a, and so that, in the second inclination detector (the level 80), the bubble 93 is at the zero point graduation line of the scale 92.

Figure 10:
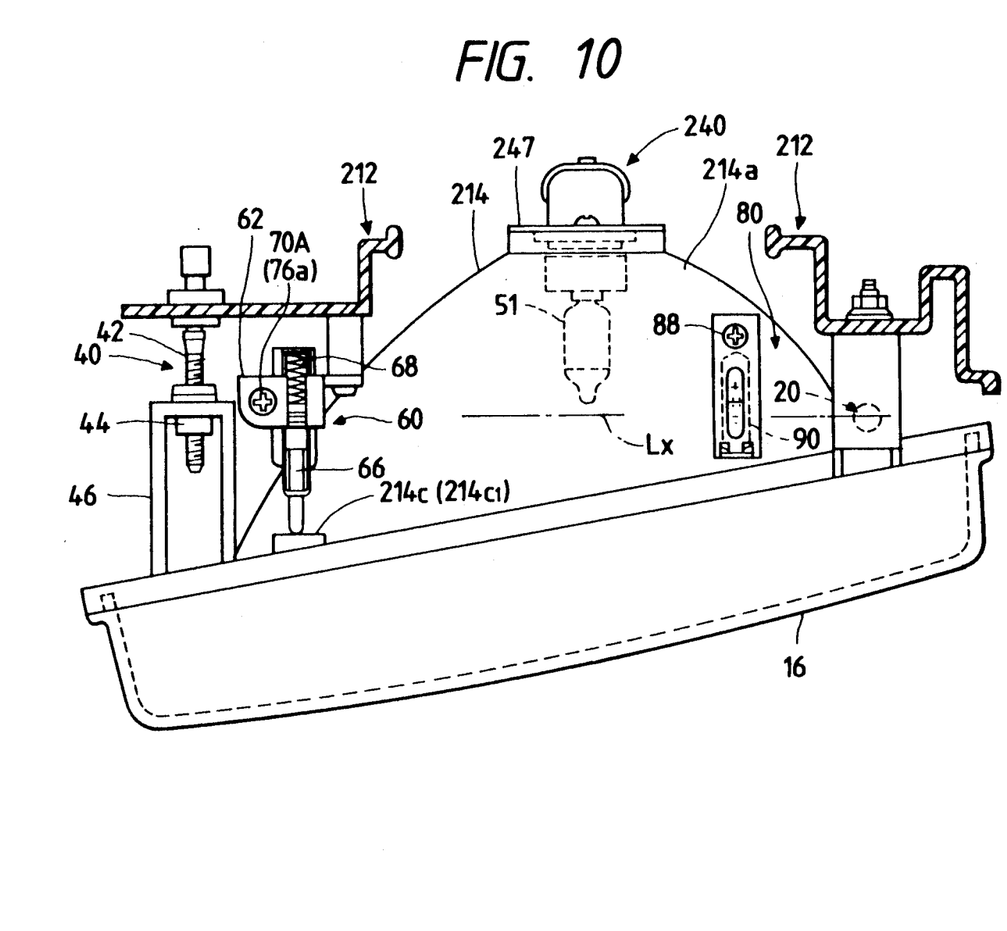
FIG. 10 is a plan view, partly as a sectional view, showing a movable unit type headlamp to which the technical concept of the invention is applied.

FIG. 10 is a plan view showing a movable-unit type headlamp in which the reference member is a lamp housing and the inclination member is a lamp body and reflector unit. Such a headlamp constitutes a second embodiment of the invention.

In the second embodiment of the invention, an inclination detector 60 for detecting the inclination of a lamp body and reflector unit 214 in a horizontal plane, and an inclination detector, which is a level 80 for detecting the inclination of the lamp body and reflector unit 214 in a vertical plane, are arranged in the horizontal plane including a horizontal axis Lx on the upper wall 214 of the lamb body and reflector unit 214.

The inclination detector 60 includes a stationary holder 62 secured to the lamp housing 212, and a slider 66 the end of which is abutted against a vertical wall 214c extended from the lamp body and reflector unit 214. The vertical wall 214c has a slider abutment surface 214 which is a curved surface the center of which is on the horizontal axis Lx. Therefore, the scale reading of the inclination detector 60 is maintained unchanged when the lamp body and reflector unit 214 are inclined in a vertical plane.

The inclination detector 60 further includes a zero point adjustment shaft 70A which is supported on the stationary holder. The zero point adjustment shaft 70A, unlike the zero point adjustment shaft 70 in the first embodiment described above, is not divided into two parts. The zero point adjustment shaft 70 protrudes upwardly, and has an operating arrangement wherein a screwdriver engaging recess 76a formed in its upper end. The level 80 is secured to the upper wall 214a of the lamp body and reflector unit 214. In FIG. 10, reference numeral 240 designates a bulb socket; and 247, a socket fixture to fix the bulb socket 240 in a socket hole formed in the lamp body and reflector unit 214.

The remaining components are the same as those in the movable reflector type headlamp described above, and are thus designated by the same reference numerals or characters.

As is apparent from the above description, in the vehicular headlamp according to the invention, the amount of inclination of the reflector about the vertical axis is manifested as forward or rearward displacement of the slider relative to the movable holder. Therefore, the amount of inclination of the reflector in the horizontal plane, namely, the amount of inclination of the headlamp in the horizontal plane, can be detected from the amount of displacement of the slider relative to the movable holder. Hence, the zero point adjustment of the scale of the inclination detector with the zero point adjustment shaft (setting the slider at the reference position) provides the following effect: When the slider is shifted from the reference position, the reflector is tilted with the aiming mechanism until the slider is set to the reference position. Thus, the angle of irradiation of the headlamp in the horizontal plane can be correctly adjusted with ease.

The zero point adjustment shaft can be made to protrude from a predetermined side of the reference member. Therefore, in the invention, unlike in the prior art, the region for installation of the zero point adjustment shaft operating device is not limited to the region behind the reference member, that is, it may be installed at a position which is chosen for ease of operation in accordance with conditions around the headlamp mounting position. If the zero point adjustment shaft is arranged to protrude from the upper wall of the headlamp, it can be operated more readily, that is, the zero point adjustment can be achieved with ease.

What is claimed is:

1. A vehicular headlamp in which an inclination member with a light reflecting surface for setting the axis of irradiation of a lamp is supported by an aiming mechanism in such a manner that said inclination member is inclinable with respect to a reference member arranged behind said inclination member, said vehicular headlamp having an inclination detector which comprises:

a stationary holder secured to said reference member;
a movable holder coupled to said stationary holder in such a manner that said movable holder is slidable forwardly and rearwardly relative to said stationary holder, a rack being formed on one side of said movable holder;
a slider engaged with said movable holder in such a manner that said slider is slidable forwardly and rearwardly relative to said movable holder, said slider being elastically urged so that a front end thereof is abutted against said inclination member, whereby said slider is allowed to slide as said inclination member inclines about a vertical axis; and
a zero point adjustment shaft having a gear mounted thereon which is engaged with said rack formed on one side of said movable holder, said zero point adjustment shaft being supported by said stationary holder and extending in a direction perpendicular to a sliding direction of said movable holder.

2. The vehicular headlamp as claimed in claim 1, wherein said reference member is a lamp body, said inclination member is a reflector which is inclinable inside said lamp body, and said zero point adjustment shaft penetrates said lamp body, and has a driving part exposed outside said lamp body.

3. The vehicular headlamp as claimed in claim 1, wherein said reference member is a lamp housing, and said inclination member is a lamp body and reflector unit having a reflector formed on the inner surface thereof.

4. The vehicular headlamp as claimed in claim 1, wherein said stationary holder comprises a movable holder receiving recessed portion, a shaft case accommodating said gear, and a bracket for securing said stationary holder to said reference member, said movable holder receiving recessed portion, said shaft case, and said bracket being integrally formed as a single unit.

5. The vehicular headlamp as claimed in claim 4, wherein said movable holder has the form of a cylinder with two flanges formed on respective opposite sides of the cylinder, said rack being formed on one of said flanges.

6. The vehicular headlamp as claimed in claim 4, further comprising a compression coil spring disposed in said movable holder receiving recessed portion for elastically urging said front end of said slider into abutment against said inclination member.

7. The vehicular headlamp as claimed in claim 6, wherein a front end part of said slider is smaller in diameter than a rear end part of said slider.

8. The vehicular headlamp as claimed in claim 7, wherein graduation lines are marked on said rear end part of said slider in correspondence to a reference line marked on said movable holder.

9. The vehicular headlamp as claimed in claim 1, wherein a portion of a rear surface of said inclination member abutted by said front end portion of said slider is curved with a radius of curvature whose center is on a horizontal axis of said headlamp.

10. The vehicular headlamp as claimed in claim 7, further comprising a transparent sight window attached to an aperture in a wall of said reference member for permitting viewing of said graduation lines and said reference line.

11. The vehicular headlamp as claimed in claim 10, wherein said sight window comprises a cylindrical cap-shaped member having a cylindrical portion fitted in said aperture.

12. The vehicular headlamp as claimed in claim 10, wherein said zero point adjustment shaft comprises a driven shaft supported on said shaft case, and a driving shaft coupled to said driven shaft and rotatably supported on said sight window.

13. The vehicular headlamp as claimed in claim 10, wherein said sight window comprises a cylindrical protrusion rotatably receiving an upper end portion of said driving shaft.

14. The vehicular headlamp as claimed in claim 13, wherein said upper end portion of said driving shaft has a screwdriver engaging portion recess therein.

15. The vehicular headlamp as claimed in claim 13, further comprising a O-ring fitted inside said cylindrical protrusion and engaging an internal flange of said cylindrical protrusion with said upper end portion of said driving shaft, and an E-ring engaged with said driving shaft on an opposite side of said internal flange from said O-ring.

16. The vehicular headlamp as claimed in claim 1, further comprising a second inclination detector for detecting an amount of inclination of said reference member around a horizontal axis.

17. The vehicular headlamp as claimed in claim 16, wherein said second inclination detector comprises level means.

* * * * *